Feb. 28, 1928.
G. T. ALLEN
1,660,777
FLUID CHARGING AND DISCHARGING VALVE FOR CONCRETE MIXERS
Filed April 9, 1924    3 Sheets-Sheet 1
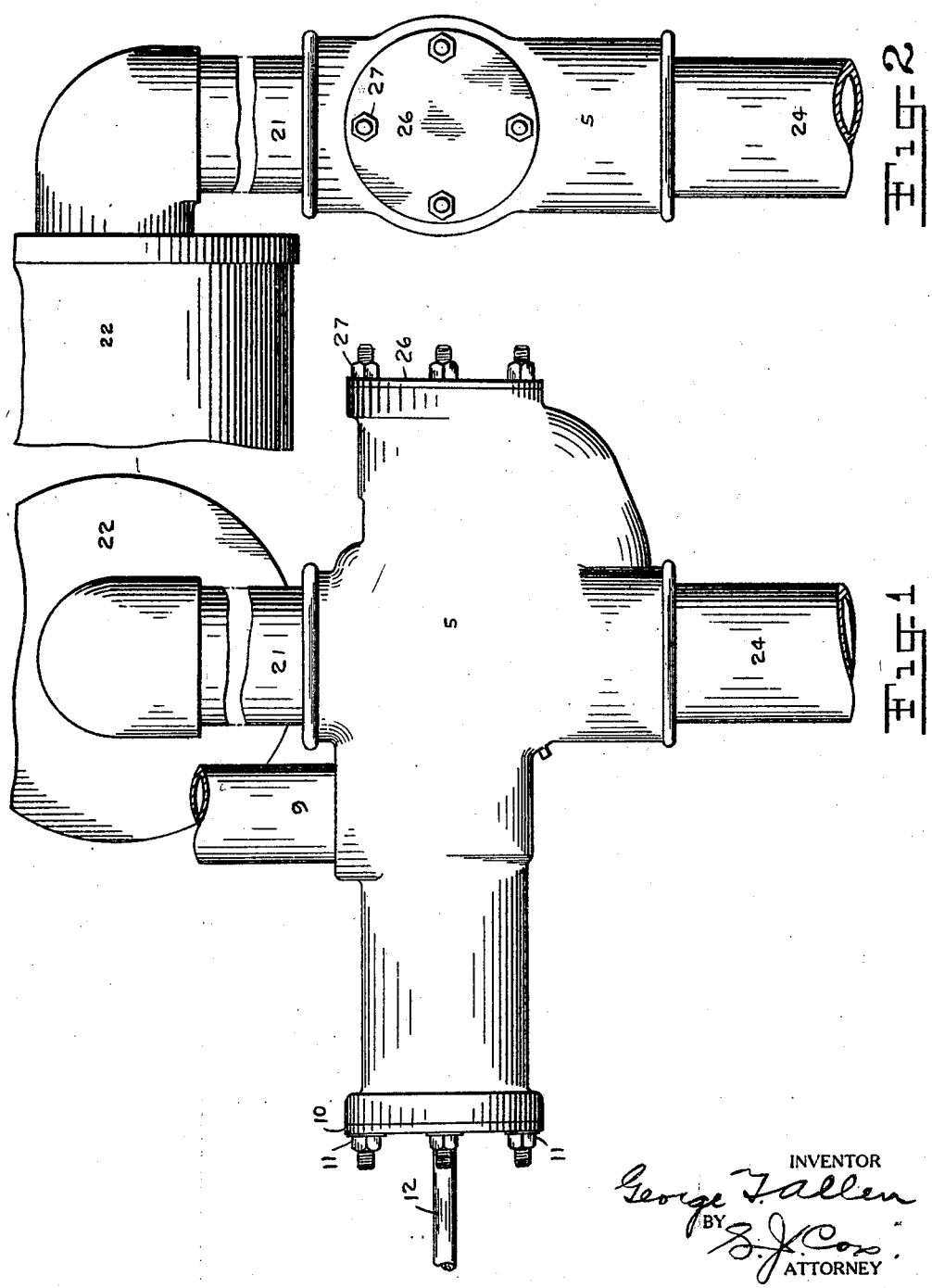
INVENTOR
George T. Allen
BY
ATTORNEY

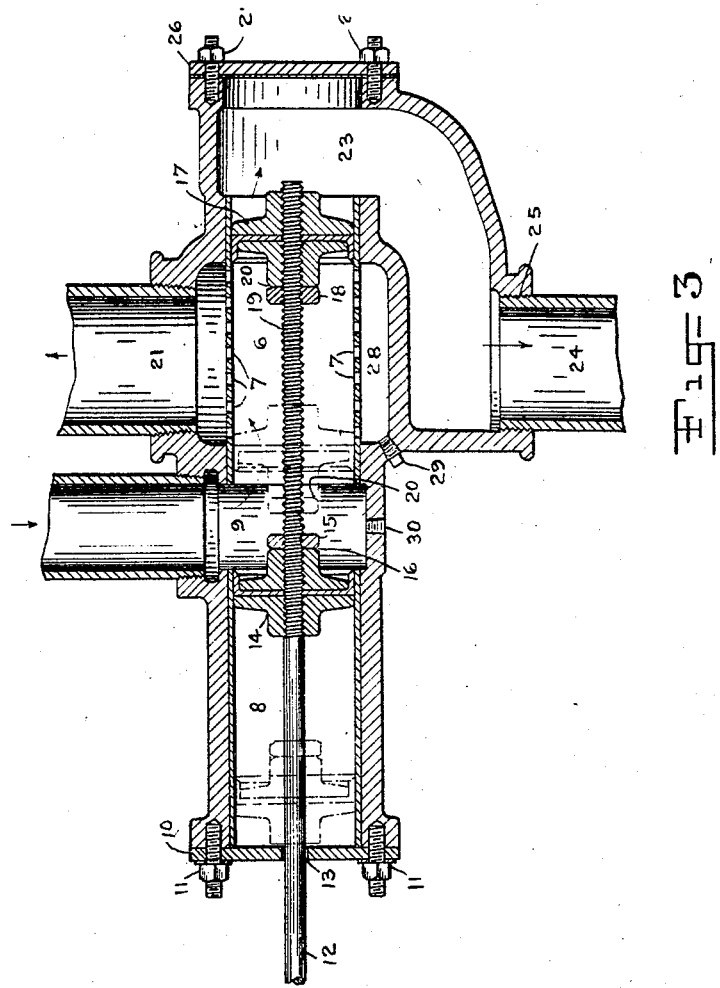

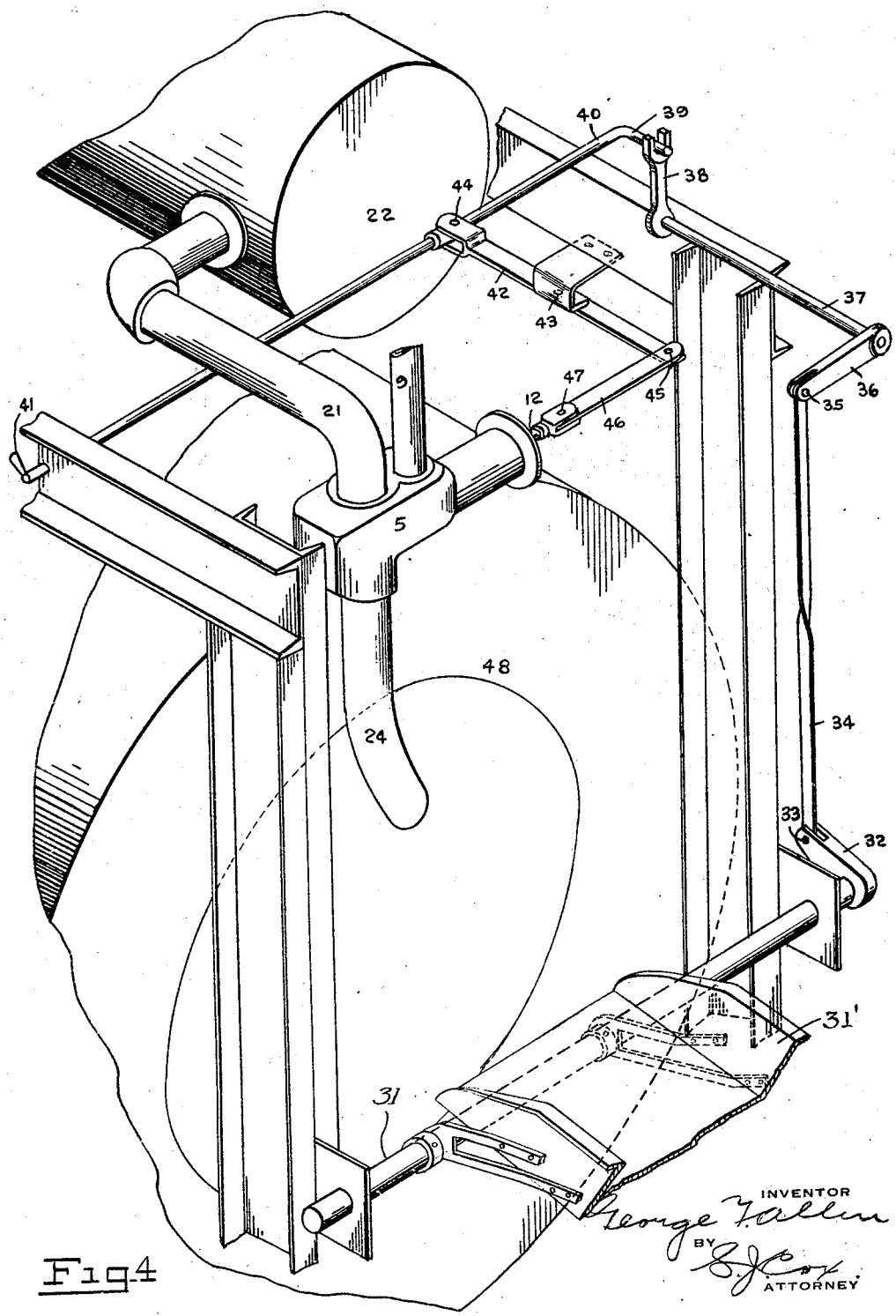

Patented Feb. 28, 1928.

1,660,777

UNITED STATES PATENT OFFICE.

GEORGE T. ALLEN, OF NEW YORK, N. Y., ASSIGNOR TO RANSOME CONCRETE MACHINERY COMPANY, OF PLAINFIELD, NEW JERSEY, A CORPORATION OF NEW JERSEY.

FLUID CHARGING AND DISCHARGING VALVE FOR CONCRETE MIXERS.

Application filed April 9, 1924. Serial No. 705,218.

This invention relates to a charging and discharging valve and the operative control of the same and its novelty consists in the adaptation and arrangement of parts as will be hereinafter more fully pointed out.

Great difficulty has been experienced in the handling of the water supply to concrete mixers particularly because the water often contains sand or other hard substances which soon destroy the hard seat valves.

My device overcomes this difficulty and provides a valve which has a packing which is easily removable and furnishes a valve which stands up under the difficult operative conditions and also is so controlled that it can automatically supply the water required for the mixing operation cooperating with the movement of the mixing machine or be operated manually when so desired.

Referring to the drawings, Figure 1 is a front view of my valve showing the connections broken away for convenience in illustration. Figure 2 is an end view of my valve looking at Figure 1 from the right hand side and showing the broken connection to the water tank in a different position for convenience in illustration. Figure 3 is a vertical section of the valve shown in Figure 1. Figure 4 is a perspective of my valve mounted in a concrete mixing machine and showing the connecting and operative parts.

In the drawings 5 is a valve having a cylindrical chamber 6 and said cylindrical chamber 6 has openings 7 therein. The cylindrical chamber 6 has an extension cylindrical chamber 8 and a water feed pipe 9 enters the valve 5 through said cylindrical chamber 6 so as to divide said chamber 6 from the extension chamber 8. A head 10 is rigidly secured to the valve 5 by means of the usual bolts and nuts at 11 so that it can be readily removed, and a plunger rod 12 is mounted in said head 10 passing through the same at 13. A valve member 14 having a leather or other suitable packing 15 is adapted to seat in a seat 16 in the base of the pipe 9 and is mounted on the plunger rod 12 by means of a threading 19 on said plunger rod. A second valve 17 having a suitable packing 18 is also mounted on the inner end of the plunger rod 12 on said threading 19 and said valve 17 is adapted to seat the packing 18 in a valve seat 20 in the base of the pipe 9 opposite the valve seat 16. At 20 and 16 there are openings through into the pipe 9 thereby permitting the water in the feed pipe 9 to enter the cylindrical chambers 6 and 8. A second pipe 21 connects with the upper side of the cylindrical chamber 6 and leads to a water tank 22 of usual construction used in devices of this kind. The valve 5 has a third chamber 23 at the inner end of the plunger rod 12 leading to a pipe 24 which is rigidly connected thereto at 25 and leads to a mixing drum 48 of the concrete mixer of usual construction partially shown herein. A second head 26 is secured to the portion of chamber 23 opposite the end of the cylindrical chamber 6 by means of the usual bolts and nuts at 27 so that it can be readily removed when desired. The cylindrical chamber 6 drains into a base chamber 28 which has a drain plug 29 and the pipe 9 also has a drain plug 30 at its base.

In Figure 4 is shown in part, the rest being broken away for convenience in illustration, the portion of a concrete mixing machine involved in my device in which 31 is a loader bucket shaft, the loader bucket being shown at 31', on the outer end of which shaft is rigidly secured a rocker arm 32 to which is oscillatably mounted at 33 lifting rod 34 oscillatably connected at 35 to a rocker arm 36 which is rigidly secured at the other end thereof to a rocker shaft 37. A U-shaped arm 38 is rigidly secured to the opposite end of the rocker shaft 37 and a right angle hook member 39 of a horizontal rod 40 is adapted to rest in the U-shaped vertical arm 38. The horizontal rod 40 has a handle 41 at its outer end adapted to be operated manually and a pivot arm 42 is pivoted at 43 to the frame of the mixing machine. The pivot arm 42 is oscillatably connected at 44 to the horizontal rod 40 and the opposite end of the pivot arm 42 is oscillatably connected at 45 to a connecting arm 46 which is oscillatably connected at 47 to the plunger rod 12 of the valve 5. The mixing drum 48 of usual construction is also shown in Figure 4 and into which the water from the delivery pipe 24 is adapted to empty. The connection of the pivot arm 42 at 44 is such that the horizontal rod 40 can be turned by means of the handle 41 so as to lift the right angle hooked end 39 out of the U-shaped vertical arm 38 so that said rod 40 can be operated manually to control the valve 5.

In the usual operation of my device as the feed hopper 31' is lowered to receive its load the shaft 31 on which it is mounted is rotated so as to lift the rocker arm 32 thereby pushing up the lifting rod 34 which raises the rocker arm 36 so that the rocker shaft 37 is rotated thereby turning the U-shaped arm 38 therewith so as to pull the horizontal rod 40 which draws the pivot arm 42 at the end 44 where it is secured to the rod 40 thereby pushing the connecting arm 46 and the plunger rod 12 whereby the valve 17 is pushed to the position shown in Figure 3 thereby permitting the water from the supply pipe 9 to flow into the chamber 6 and through the pipe 21 into the tank 22. As the feed hopper is raised to dump the load into the mixing drum 48 shaft 31 is rotated so as to pull down on the rod 34 thereby through the rocker arm 36 rotating the rocker shaft 37 in the opposite direction whereby the upright U-shaped arm 38 is thrown in the opposite direction thereby pushing rod 40 so that the pivot arm 42 is swung in the opposite direction thereby pulling through the connecting arm 46 the plunger rod 12 so that the valve 17 seats in the valve seat 20 thereby cutting off the water supply from pipe 9 and permitting the water from the tank 22 to flow through the pipe 21, cylinder chamber 6, through the third chamber 23 and the delivery pipe 24 into the mixing drum 48.

If sufficient water is not thereby permitted to run into the mixing drum 48 during the movement of the feed hopper as described then the rod 40 and the hooked end 39 can be turned out of engagement with the U-shaped arm 38 by the operator taking hold of the handle 41 and pulling on said handle 41 thereby seating said valve 17 and the valve member 18 in the valve seat 20 whereby the pipe 9 and the water supply is cut off and the water from the tank 22 is permitted to flow through the pipe 21 and chamber 6 into chamber 23 thence into pipe 24 and into the mixing drum 48 until sufficient water has run to supply the requirements when the operator can again push in on the handle 41 thereby restoring rod 40 to its normal position with the hooked end 39 resting in the U-shaped arm 38 and thereby restoring the valve 17 to the position shown in Figure 3 and permitting the water to flow from the supply through the valve 20, chamber 6 and pipe 21 into the tank 22.

Whenever the valve packings 15 or 18 require renewal this can be readily accomplished by the removal of the head 10 or the head 26 by the removal of the nuts and bolts at 11 or the nuts and bolts at 27 respectively, whereupon the valves 14 and 17 are readily accessible.

I claim:

1. In a concrete mixing machine, the combination of a water supply conduit, a valve having means for controlling a water supply through said conduit, a water supply tank, means for controlling a supply of water thereto, a water delivery conduit leading from said tank, means for controlling the delivery of water therefrom, a feeding device for solid material and automatic means for operating said last water controlling means by the operation of said feeding device, said automatic operating means comprising positive connections between the controlling means and said feeding device whereby the former is adapted to be moved by the latter in two directions and is normally held thereby against independent movement.

2. In a concrete mixing machine comprising a mixing drum, a tank and automatic means for controlling a supply of water thereto, said automatic means also controlling the supply of water from said tank to the said drum, a feeding device operating said automatic means, and positive operating connections between said automatic means and said feeding device.

3. In a concrete mixing machine comprising a mixing drum, a tank, automatic means for controlling the supply of water thereto, said automatic means also controlling the supply of water from said tank to said drum, means adapted to be actuated by a feeding hopper, operative connections between said last named means and said automatic means whereby the latter is adapted to be controlled at all times by the former, and means for manually operating said controlling means.

4. In a concrete mixing machine comprising a mixing drum, a tank, automatic means for controlling the supply of water thereto, said automatic means also controlling the supply of water from said tank to said drum, means for charging the mixing drum with solid material, operative connections between said automatic means and said charging means, means for manually operating said controlling means, and means for disconnecting said automatic means without disconnecting said manually operating means.

5. In a machine of the character described, a tank provided with an opening through which it is adapted to be charged and discharged, charging and discharging ducts communicating therewith, a valve constructed and arranged to be moved to alternately open and close the charging and discharging ducts, a mixing drum with which said discharge duct communicates, means for charging said mixing drum with solid materials to be mixed with liquid from the tank, said means comprising a member mounted for rotation therewith on charging and return movements of said charging means, and operative connections between said member and said valve constructed and arranged to automatically move said valve to discharge duct opening position on charging movement, and to closing position and charging duct opening position on return movement.

6. In the device specified in claim 5 means for manually operating said valve and for disconnecting the same from said automatic operating means, said manually operating means being operatively connected while the automatic means are connected.

Witness my hand this 3d day of April, 1924, at Dunellen, county of Middlesex, State of New Jersey.

GEORGE T. ALLEN.